Nov. 16, 1937.    J. LIMESES ET AL    2,099,612
SCULPTURE
Original Filed Feb. 3, 1933    3 Sheets-Sheet 1

Inventors,
J. Limeses, A.M.M.T.M. Saralegui
and C.A.P. del Cerro
Glascock Downing Seebold
By    Attys.

Nov. 16, 1937.    J. LIMESES ET AL    2,099,612
SCULPTURE
Original Filed Feb. 3, 1933    3 Sheets-Sheet 2

Inventors,
J. Limeses, A. M. M. T. M. Saralegui
and C. A. P. del Cerro
Glascock Downing & Seebold
By                    Attys.

Nov. 16, 1937. J. LIMESES ET AL 2,099,612
SCULPTURE
Original Filed Feb. 3, 1933  3 Sheets-Sheet 3

Fig. 2.

Inventor;
J. Limeses, A. M. M. T. M. Sarategui
and
C. A. P. del Cerro,
Glascock Downing & Seebold
By Attys.

Patented Nov. 16, 1937

2,099,612

UNITED STATES PATENT OFFICE 2,099,612

SCULPTURE

Jose Limeses, Antonio Maria Martin Tomás Manuel Saralegui, and Carlos Alberto Pérez del Cerro, Buenos Aires, Argentina Application February 3, 1933, Serial No. 655,132 Renewed December 10, 1936. In Argentina May 20, 1932

12 Claims. (Cl. 41—25)

This invention relates to the instruments and method for the mechanical manufacture of sculptures by means of stereoscopic metrical photographs:

In the accompanying drawings wherein an approved embodiment of the invention is illustrated:

Fig. 1 is a plan view of the arrangement of cameras in accordance with the invention for photographing the object to be sculptured.

Fig. 1$^a$ is a diagrammatic plan view of the plate holder of one of the cameras.

Fig. 2 is a top plan view of an apparatus constructed in accordance with the invention.

Fig. 4 is a side elevation of the apparatus.

Figure 1:
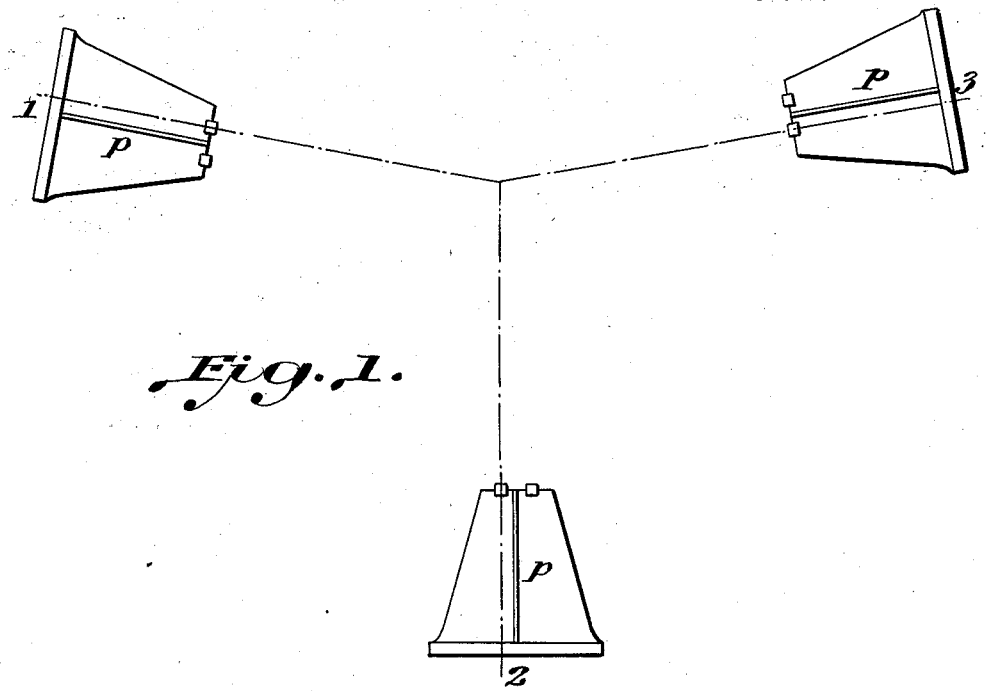

An equipment, Figure 1, of three photogrammetric stereoscopic cameras 1, 2, 3, invariably joined in such a manner that the three main optical axes of the left hand objectives concur to the same point.

We call stereoscopic photogrammetric camera, a photographic camera provided with two identical objectives free from aberrations, separated by a perfectly known distance and arranged in such a manner that the main optic axes thereof are perfectly perpendicular to an absolutely plane metallic frame on which the photographic plate is resting at the moment same is impressed. On the metallic frame there are six marks: $a$, $b$, $c$, $d$, $e$, $f$, arranged in such a manner that the straight lines determined by $ae$ and $bd$ perpendicularly intersect the straight line $fc$ at the points $o$ and $o'$, through which the main optic axes of the photographic objectives pass. The six marks $a$, $b$, $c$, $d$, $e$, $f$, are impressed on the photographic plate. The stereoscopic photogrammetric camera also has in the interior thereof a screen $p$, the object of same being to divide the photographic plate into two halves, in such a manner that on each half only the image of its corresponding objective will appear.

Once the person or object, the mechanical sculpture of which it is desired to obtain, is placed in the intersection of the three optic axes of the stereoscopic photogrammetric camera, and in such a manner that the image will be perfectly clear in the three cameras, the six objectives are simultaneously actuated (two for each camera) and the three pairs of stereophotograms are obtained, with which the sculpture is mechanically formed following the process which will be explained hereinafter and using, for such a purpose, the apparatus which will be described later.

(Eventually, the assembly of the three stereoscopic photogrammetric cameras actuating simultaneously may be substituted by only one camera which is successively placed in three positions, the relative location of which is well known.)

Two guides 2 on which the double bridge 3 slides, are placed in a perfectly parallel manner on a cast iron table 1. Perpendicularly to these guides is the guide 4 on which travel the plate-holding carriages 30$^l$ and 30$^r$ on which the plates P$l$ and P$r$ are placed. These plates constitute the pair of a stereogram obtained with any of the three cameras, and result from cutting in half the impressed photographic plate, in such a manner that the image given by the camera's left hand objective remains in the frame 29$^l$ (plate P$l$) and the one given by the right hand objective remains in the frame 29$^r$ (plate P$r$).

Passing over the frames 29$^l$ and 29$^r$ and arranged parallel to the guides 2, is the bridge.

Parallel to the guide 4 is located the bridge 7 which houses three axles 8, 9 and 10 on which the rulers 11, 12 (straight) and 13 (with a 90° angle), respectively rotate.

Figure 3:
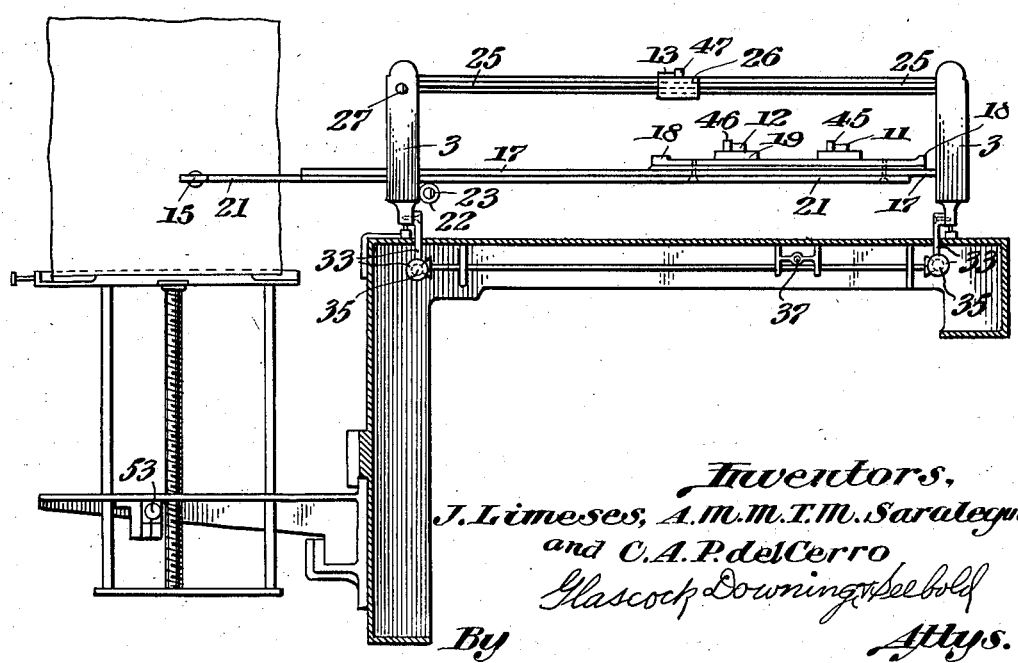
Fig. 3 is a vertical sectional view on the line 3—3 of Fig. 2.

The double bridge 3 travels on the guides 2 resting on and adjusted by ball bearings, being driven in its movements by the action of two nuts 33 fixed to the bridge itself (see Figure 3) which are actuated by means of identical screws 35 in turn governed from the crank 16 by means of an axle 37 and corresponding pinions 36.

The double bridge 3 consists of two parallel guides 17 and 25 arranged over each other and perpendicular to the guides 2 on which the bridge travels.

A carriage 18, resting on and adjusted in ball bearings, travels on the inferior guide 17. In this carriage there is a guide parallel to 17, on which the piece 19, perfectly adjusted, may slide, the movements of said piece being measured by means of a graduated rule and a nonius. On the carriage 18 there is also a fixed pivot 45 on which the ruler 11 rests laterally, and on the sliding piece 19 there is a further pivot 46 identical to 45 on which the ruler 12 also rests laterally.

The carriage 18 is joined to a ruler 21 which travels guided in the lower part of the guide 17 and having on its end 15 the tool which will execute the sculpture. The ruler 21 has at the lower part thereof a rack on which the pinion 22 actuates, said pinion being integral with the bridge 3 and is rotated by means of the axle 23 governed by the crank 24. The axle 23 has throughout its length a key in order that the action of the axle 23 on the pinion 22 may be transmitted continually notwithstanding the movements of the bridge 3 on which, as already stated, the pinion 22 is fixed.

The upper guide 25 of the double bridge 3 has a downward U-section. The piece 26 travels on this guide 25, said piece having a pivot 47, identical to 45 and 46, on which the ruler 13 rests laterally. The sliding piece 26 is displaced by means of a screw placed in the interior 25 which by means of a pinion 49 and the axle 27 is actuated by the crank 28.

This crank 28 also actuates on the pinions 42 to rotate the axle 43 which in turn, by means of a further set of pinions 53 allows the vertical displacement of the table 14. This table 14, on which the block used to engrave the details of the sculpture is placed, is suitably connected to the table 1. The vertical displacements of the table 14 are exactly the same as the displacements of the sliding piece 26 along the guide 25, for which purpose the screws governed from the crank 28 are of the same pitch.

The block rests on the table 14 on the disc 44 which can rotate about its center for the purpose of giving the block a rotation to the right or to the left, and thus be able to arrange same in three positions corresponding to the three pairs of stereophotograms obtained of the person or object with the three stereoscopic photogrammetric cameras.

The frames 29$^l$ and 29$^r$ respectively rest on the plate-holding carriages 30$^l$ and 30$^r$ on which they may rotate to allow for small corrections in the location of the plates. The carriage 30$^l$ is joined to the piece 34 by means of a bar 50. Said piece 34 has a housing for a pivot 39 identical to the pivots 45, 46 and 47. The pivot 39, perfectly adjusted, may be displaced in two perpendicular directions and parallel to the guides 2 and 4, respectively. The assembly 30$^l$—34 is forced to rest on the ruler 11 by means of the pivot 39 and due to the action of a counter-weight 51.

The plate-holding carriage 30$^r$ has a similar arrangement to that of 30$^l$, and 40 is the pivot movable in the perpendicular directions, by which 30$^r$ rests on the lateral edge of the ruler 12 through the action of a counter-weight 52.

The carriage 32 travels on the guides of the bridge 5 and carries the stereomicroscope 6 for the binocular observation of the plates P$l$ and P$r$, in such a manner that the plate P$l$ is seen through the left hand ocular and the plate P$r$ through the right hand ocular. Both oculars have identical reticles in the shape of a small black spot.

Said carriage 32 has a housing for a pivot 41 identical to 39 and 40 also displaceable in two perpendicular directions and parallel to the guides 2 and 4 respectively. The carriage 32 rests against the lateral edge of the ruler 13 (90° angle) by means of pivot 41 and this position is maintained through the action of a counter-weight.

Having described the apparatus, the operation of same will now be explained, but before doing so the following principles should be pointed out:—

All the apparatus for measuring the stereograms, with oculars provided with identical reticles, produce an optic illusion for the observer. Said illusion consists in that the observer receives the sensation of seeing in perfect relief the subject appearing on the plates, and that the two reticles of the oculars appear as only one floating on the relief he illusively contemplates. If the plates are displaced on the same plane in respect to each other, the observer receives a new optical sensation, and believes that the reticle floating over the illusory relief, moves nearer to him (or further away), depending on whether the plates are separated further from each other (or approached to each other).

Based on these principles, the apparatus operates as follows:—

The rulers 11, 12 and 13 are placed perfectly parallel to each other and perpendicular to the guides 17 and 25 of the double bridge 3; and the pivots 39, 40 and 41 are moved until their distances to the centers of the axles 8, 9 and 10 are identical to the known focal distance of the stereoscopic photogrammetric camera with which the pair of stereograms P$l$ and P$r$ have been obtained.

The plates P$l$ and P$r$ are placed in their housings 29$^l$ and 29$^r$ and they receive slight correction movements until the reticle of the left hand ocular of the stereomicroscope travels on the straight line $ae$ and the right hand reticle of the stereomicroscope travels on the straight line $bd$ when the carriage 32 carrying the stereomicroscope 6 travels lengthwise on the guides of the bridge 5. The corrections necessary for the plates until the above is obtained, takes place by rotating the frames 29$^l$ and 29$^r$ over the carriages 30$^l$ and 30$^r$ and displacing said carriage in the direction of the guide 4 by suitable movement of the pivots 39 and 40 in said direction. The pivot 41 is immediately displaced in the direction of the guides of the bridge 5 until the stereomicroscope has the reticle thereof coinciding with the straight line $fc$. At this moment, the reticles are over the points $o$ and $o'$ (Figure 1) of both stereograms.

The sliding piece 19 is then displaced towards the left for a length equal to the distance separating the two objectives of the stereoscopic photogrammetric camera with which P$r$ and P$l$ were impressed, said displacement being measured on the graduated rule with nonius mentioned hereinbefore. (If the displacement of 19 is equal to the separation of the objectives of the camera, the resulting sculpture will be of a natural size; if the displacement of 19 is equal to half the separation of the objectives, the resulting sculpture will be half the natural size, and so forth.)

The block is then placed on the rotating disc 44 of the table 14 and is firmly held in place.

Actuating now the crank 28 so that the sliding piece 26 is displaced towards the right and the action of the movement of the ruler 13 pushes the carriage 32 with the stereomicroscope in the direction of the guides of the bridge 5, the observer sees the only reticle floating on the upper part of the object or person reproduced on the plates P$l$ and P$r$. At the same time, through the action of the pinions 42 and axle 43 the lowering of the table 14 will have been attained, said table descending until the tool 15 touches the upper part of the block.

If the crank 24 is now actuated, same rotates the axle 23 and pinion 22 which displaces the ruler 21 from left to right (for example) and the latter in turn displaces the carriage 18 and the pivots 45 and 46 in same, said pivots pushing the rulers 11 and 12 which then rotate about their respective axles 8 and 9 pushing from 39 and 40 the plate-holding carriages 30$^l$ and 30$^r$ thus moving the plates in the direction of the guide 4 but from right to left. The person observing through the stereomicroscope receives the sensation that the only reticle floating over the illusory relief displaces from left to right, that is to say, in the same direction as the tool 15 and the ruler 21 holding same.

If the crank 16 is moved in such a manner that the double bridge 3 slides away, for example, over the guides 2, as the rulers 11 and 12 are no longer parallel owing to the displacement previously given to the sliding piece 19, said rulers, due to their contact with the pivots 45 and 46 respectively, will rotate about their axles 8 and 9:—the ruler 12 clockwise, the ruler 11 anticlockwise; and therefore the carriage 30*l* moves towards the right and the carriage 30*r* moves towards the left, in such a manner that the plates P*r* and P*l* move nearer together, and the person observing through the stereomicroscope receives the sensation that the only reticle floating over the illusory relief moves away from him in the same way as the double bridge 3 carrying the tool 15 on the end of the ruler 21. (This sensation answers the principle mentioned at the beginning of the explanation for operating the apparatus.)

Therefore, if the crank 28 is actuated, downward or upward movements are obtained both for the only reticle floating on the illusory relief and the block on which the sculpture is engraved; if the crank 24 is actuated, movements from right to left or vice versa are obtained on the tool as well as on the reticle, and if the crank 16 is moved, frontward or backward movements are obtained on the tool as well as on the reticle; that is to say, combining the movements of the three cranks, the observer has the sensation of taking the only reticle floating over the optic relief to have continual contact with the person or object seen in relief, tracing any line on the surface of such person or object, while the tool faithfully obeying the movements of the reticle, engraves on the block all the unevenness and sinuosities of the figure to be reproduced in sculpture.

To finish the sculpture of the photographed object, it is necessary, once the work originated by the pair of stereograms obtained with one of the stereoscopic photogrammetric cameras is finished, to substitute said pair by the pair obtained by one of the other cameras and rotate the block on the rotating disc 44 the corresponding angle; to end the work with this pair of stereograms and finally to substitute this pair by the last pair not yet worked upon, again rotating the block on the disc 44 for the necessary angle.

Thus, the apparatus allows the production in a mechanical and sculptural manner, of any surface by lines arranged on such surface in the most convenient or advantageous way, without any kind of limitation.

We claim:

1. An apparatus of the character described comprising movable plates for supporting stereoscopical photographs, a carriage mounted for movement in two directions, a sculpture tool actuated by said carriage, means for displacing one of said plates, means for imparting movement of said plate to said carriage, means for imparting movement of the carriage to the other plate, and means for actuating the carriage to effect displacement of the second mentioned plate.

2. An apparatus as claimed in claim 1 characterized by the provision of means supporting said plates for rectilinear movement.

3. The herein described method of photographing objects comprising, locating a stereoscopic photogrammetric camera having right and left objective lenses successively in three positions relative to said object with the main optical axis of one lens passing through one and the same focal point in each location of said camera.

4. Apparatus of the class described comprising, three stereoscopic photogrammetric cameras each having a pair of right and left objective lenses, respectively, and shutters for said lenses, and grouped about a common center with the main optical axis thereof in predetermined fixed relation, the shutters of said cameras being operative simultaneously.

5. Apparatus of the class described comprising, three stereoscopic photogrammetric cameras each having a pair of right and left objective lenses, respectively, and shutters for said lenses and being fixedly supported with the main optical axis of one lens of each pair intersecting at a common focal point, the shutters of said cameras being operative simultaneously.

6. The herein described method of sculpturing in plastic material with a tool to reproduce an object and comprising, photographing the object simultaneously from different angles stereoscopically to obtain a number of pairs of stereograms thereof, mounting the pairs of stereograms in succession in a common plane beneath a binocular stereoscope having a reticle in each ocular, visualizing the stereograms through this stereoscope to cause the reticles to merge into one, manipulating the stereograms of each pair and the stereoscope, relatively, to cause the merged reticle to follow in selected paths over the image visualized through said stereoscope, and manipulating the tool in accordance with the visualized path followed by said reticle.

7. In apparatus of the class described, a pair of relatively movable frames for supporting a pair of stereograms, respectively, a binocular stereoscope mounted above said stereograms and having a reticle in each ocular merging into one when viewed through the oculars, a movable sculpturing tool, and means for moving said stereograms and stereoscope, relatively, to cause said merged reticle to follow in selected paths over the image visualized through said stereoscope and also moving said tool in correspondence with said merged reticle, said means comprising, a carriage rectilinearly and laterally movable, a rigid connection between said carriage and tool, manipulative means for moving the carriage rectilinearly, manipulative means for moving the carriage laterally, operating connections between said carriage and frames comprising a pair of swingably mounted bars operatively connected to said frames, respectively, means for moving said stereoscope comprising a second carriage laterally movable with the carriage first mentioned and independently movable rectilinearly, a swingably mounted bar operatively connected to the stereoscope and operated by the second mentioned carriage, and means for moving the second mentioned carriage rectilinearly comprising a manually operated feed screw.

8. A sculptured reproduction of an object comprising a mechanically executed counterpart of pairs of stereograms of the object photographed from different angles and as viewed through a stereoscope.

9. A sculpture as claimed in claim 8 characterized in that the counterpart of the different pairs of the stereograms are delineated on the sculpture on a different side thereof.

10. In apparatus of the class described, a vertically adjustable work support, a pair of frames for supporting a pair of stereograms, respectively, a binocular stereoscope having a reticle in each ocular merging into one when viewed through said oculars, said stereoscope being mounted above said frames for movement thereover to locate the merged reticle at the upper edge of the image visualized through said oculars, and manipulative means common to said support and stereoscope for moving the same in synchronism.

11. Apparatus for mechanically reproducing in sculpture photographs of objects taken at different angles thereto by cameras located at different points and comprising, a work table, a sculpturing tool manipulative relative to the work, and a work supporting disc on said table rotatable thereon to different set positions to adjust the work relative to the tool in degree corresponding to the angles formed by the optical axis of the camera lenses in said different positions of said cameras.

12. In apparatus of the kind described, a pair of frames movable in respect to each other for supporting respectively each of the elements forming a pair of stereograms, a binocular stereoscope mounted on said stereograms, containing a reticle in each ocular which are merged into a single reticle when same are simultaneously viewed through the oculars, a movable sculpturing tool, and means for relatively moving said stereograms and stereoscope to cause said merged reticle to travel over selected parts of the relief image originated by the stereograms when viewed through said stereoscope, and also to cause said sculpturing tool to move in correspondence with the movements of said merged reticle, said means comprising a rectilinearly moving carriage on which said stereoscope is placed, a ruler in the shape of a right angle capable of balancing on an axle around the apex of said angle and operatively connected to the stereoscope by means of said carriage, another two carriages movable rectilinearly and laterally, on which are housed the frames with the stereograms, a rigid connection between these two latter carriages and the sculpturing tool, manipulative means for the movement of the carriages, operative connections between said two carriages and the sculpturing tool, comprising a pair of rulers each capable of balancing about an axle operatively connected by one end to the two carriages mentioned, and to the other end to the sculpturing tool, a rectilinearly moving double bridge supporting a toothed bar having at one end the sculpturing tool and at the other the connections operative between said tool and the two rulers which are in turn connected to the carriages supporting the pair of stereograms, and manipulative means for moving the double bridge and toothed bar mentioned, comprising a master main screw movable by hand and an axle also operated by hand and having a displaceable gear constantly meshing with the toothed bar supporting at one end thereof the sculpturing tool.

JOSE LIMESES.
ANTONIO MARIA MARTIN
    TOMÁS MANUEL SARALEGUI.
CARLOS ALBERTO PÉREZ
               DEL CERRO.